United States Patent
Rätzsch et al.

(10) Patent No.: US 7,196,131 B2
(45) Date of Patent: *Mar. 27, 2007

(54) POLYMER-MODIFIED INORGANIC PARTICLES

(75) Inventors: Manfred Rätzsch, Wilhering/Thalheim (AT); René Dicke, Linz (AT); Markus Machherndl, Leonding (AT); Gerd Granner, Paching (AT)

(73) Assignee: Agrolinz Melamin GmbH, Linz (AT)

(*) Notice: Subject to any disclaimer, the term of this patent is extended or adjusted under 35 U.S.C. 154(b) by 126 days.

This patent is subject to a terminal disclaimer.

(21) Appl. No.: 10/450,427

(22) PCT Filed: Dec. 12, 2001

(86) PCT No.: PCT/EP01/14581

§ 371 (c)(1),
(2), (4) Date: Oct. 21, 2003

(87) PCT Pub. No.: WO02/48270

PCT Pub. Date: Jun. 20, 2002

(65) Prior Publication Data

US 2004/0054034 A1    Mar. 18, 2004

(30) Foreign Application Priority Data

Dec. 15, 2000 (AT) .............................. A 2086/2000

(51) Int. Cl.
- *C08K 5/34* (2006.01)
- *C08K 5/09* (2006.01)
- *C08K 5/49* (2006.01)
- *C08K 3/10* (2006.01)

(52) U.S. Cl. ................. 524/445; 524/115; 524/394; 524/446; 524/447; 524/450; 501/145; 501/148; 977/DIG. 1

(58) Field of Classification Search ................ 524/445, 524/446, 447, 448, 450; 501/145, 148
See application file for complete search history.

(56) References Cited

U.S. PATENT DOCUMENTS

| | | | |
|---|---|---|---|
| 2,807,595 A | 9/1957 | Brown | |
| 3,912,532 A | 10/1975 | Simone | |
| 3,957,718 A * | 5/1976 | Pochert et al. | 524/723 |
| 4,180,488 A | 12/1979 | Stern et al. | |
| 4,334,971 A | 6/1982 | Mahnke et al. | |
| 4,349,660 A | 9/1982 | Toivonnen | |
| 4,472,538 A | 9/1984 | Kamigaito et al. | |
| 4,558,075 A * | 12/1985 | Suss et al. | 523/216 |
| 5,102,923 A | 4/1992 | Porosoff et al. | |
| 5,162,487 A | 11/1992 | Weiser et al. | |
| 5,866,645 A | 2/1999 | Vaia et al. | |
| 5,866,654 A | 2/1999 | Fuss et al. | |
| 5,942,598 A | 8/1999 | Iwa et al. | |
| 5,955,535 A | 9/1999 | Vaia et al. | |
| 6,096,803 A | 8/2000 | Pinnavaia et al. | |
| 2004/0054034 A1 | 3/2004 | Ratzsch et al. | |
| 2004/0082697 A1 | 4/2004 | Rätzch et al. | |

FOREIGN PATENT DOCUMENTS

| | | |
|---|---|---|
| AT | 352 230 | 2/1979 |
| CA | 2000472 | 4/1990 |
| DE | 1 054 232 | 4/1959 |
| DE | 1054232 | 4/1959 |
| DE | 1 250 584 A | 9/1967 |
| DE | 1250584 A * | 9/1967 |
| DE | 196 44 930 A1 | 3/1998 |
| EP | 0 017 671 | 10/1980 |
| EP | 0 037 470 | 10/1981 |
| EP | 0 037 470 A1 | 10/1981 |
| EP | 0 037 470 B1 | 10/1981 |
| EP | 0 093 965 A2 | 11/1983 |
| EP | 0 149 652 B1 | 7/1985 |
| EP | 0 408 947 | 1/1991 |
| EP | 0 408 947 A2 | 1/1991 |
| EP | 0 484 245 | 5/1992 |
| EP | 0 822 163 | 2/1998 |
| EP | 1 038 834 A1 | 9/2000 |
| EP | 1 038 913 A1 | 9/2000 |
| JP | 52-33931 | 3/1977 |
| JP | 57-200454 | 12/1982 |
| JP | 58-217424 | * 12/1983 |
| JP | 4-305005 | 10/1992 |
| JP | 04-335045 | 11/1992 |
| JP | 10-81808 | 3/1998 |
| JP | 11-323106 | 11/1999 |
| JP | 2000-191925 | 7/2000 |
| RU | 2 154 073 | 8/2000 |

(Continued)

OTHER PUBLICATIONS

International Search Report of PCT/EP01/14581, dated Apr. 18, 2002.

(Continued)

*Primary Examiner*—Tae H Yoon
(74) *Attorney, Agent, or Firm*—Christie, Parker & Hale, LLP.

(57) ABSTRACT

The invention relates to polymer modified inorganic particles with a layer structure with an average particle diameter of 5 nm to 20,000 nm, containing 20 to 5000 mass % interlamellarly, in relation to the anhydrous inorganic particle, of a mixture of aminoplasts and water. These polymer modified inorganic particles are produced by swelling the inorganic particles with aldehydes and then reacting the inorganic particles with multifunctional $C_1$–$C_{30}$ amino compounds. The invention also relates to plastic containing polymer modified particles with a layer structure and to semi-finished products and moulded material produced from the same.

27 Claims, No Drawings

FOREIGN PATENT DOCUMENTS

| WO | WO 93/04117 | 3/1993 |
| --- | --- | --- |
| WO | WO 95/14733 | 6/1995 |
| WO | WO 96/20230 | 7/1996 |
| WO | WO 96/20239 | 7/1996 |
| WO | WO 00/09571 | 2/2000 |
| WO | WO 00/09605 | 2/2000 |
| WO | WO 00/24818 | 5/2000 |
| WO | WO 00/44669 | 8/2000 |
| WO | WO 00/49072 | 8/2000 |
| WO | WO 01/04205 | 1/2001 |

OTHER PUBLICATIONS

International Preliminary Examination Report of PCT/EP01/14581, dated May 2, 2003.

Patent Abstract of Japan, Publication No. 58-217424, Published on Dec. 17, 1983, in the name of Shimazu Kosuke.

Patent Abstract of Japan, Publication No. 04-335045, Published on Nov. 24, 1992, in the name of Nakawa Takahiro, et al.

Lagaly, "Clay minerals" (1981)16, pp. 1-21 (On Order).

Mülhaupt, "Kunststoffe [Plastics]" 87(1997)4, pp. 482-486 (On Order).

Woebcken, "Kunststoff-Handbuch (Plastics handbook)" vol. 10 of Duroplaste [Thermosetting Plastics], p. 267, Carl-Hanser-Verlag, Munich 1998 (On Order).

DATABASE WPI, Section Ch, Week 199250, Derwent Publications Ltd., London, GB; AN 1992-409808, XP002199333.

DATABASE WPI, Section Ch. Week 197717, Derwent Publications Ltd., London, GB; AN 1977-29855Y, XP002199334.

Gilman, "Flammability Studies Polymer Layered Silicate Nanocomposites" 1999, pp. 249-265 (17 pages).

Lagaly, G., "Characterization of Clays of Organic Compounds"; Clay Minerals (1981); 16, 1-21.

Mulhaupt, R., et al, "PP-Compounds als Konstruktions-werkstoffe", Kunststoffe 87 (1997)pp. 482-486.

Woebcken, "Kunststoff-Handbuch (Plastics handbook)", vol. 10 of Duroplaste (Thermosetting Plastics), p. 267, Carl-Hanser-Verlap, Munich 1998 (On Order).

Patent Abstracts of Japan for Publication No. 52-033931, publication date Mar. 15, 1977, in the name of Furusawa et al.

Patent Abstracts of Japan for Publication No. 04-305005, publication date Oct. 28, 1992, in the name of Yoshioka et al.

Patent Abstracts of Japan for Publication No. 11-323106. publication date Nov. 26, 1999, in the name of Suzuki.

Patent Abstracts of Japan for Publication No. 2000-191925, publication date Jul. 11, 2000, in the name of Tsuda.

Mulhaupt, R., et al, "PP-Compounds als Konstruktions-werkstoffe", Kunststoffe 87 (1997), pp. 482-486 (previously filed Jun. 11, 2003) partial English translation entitled "PP-Compounds as Engineering Materials".

Woebcken, "Kunststoff-Handbuch (Plastics handbook)", vol. 10 of Duroplaste (Thermosetting Plastics), p. 267, Carl-Hanser-Verlap, Munich 1998 (partial English translation only).

Woebcken, "Kunststoff-Handbuch (Plastics handbook)", vol. 10 of Duroplaste (Thermosetting Plastics), p. 267, Carl-Hanser-Verlap, Munich 1998 (partial English translation previously filed on Apr. 15, 2005).

English Translation of International Preliminary Examination Report of PCT/EP01/14581, dated May 2, 2003.

Mertschenk et al., Thiourea and Thiourea Derivatives, 2005, Wiley-VCH Verlag Gmbh & Co. KgaA, Weinheim, 14 pages.

Ammelide, Ammeline and Related Compunds, pp. 269-306.

* cited by examiner

POLYMER-MODIFIED INORGANIC PARTICLES

CROSS-REFERENCE TO RELATED APPLICATION

This application is a National Phase Patent Application of International Application Number PCT/EP01/14581, filed on Dec. 12, 2001, which claims priority of Austrian Patent Application Number A 2086/00, filed Dec. 15, 2000.

FIELD OF THE INVENTION

The invention relates to polymer-modified inorganic particles having a layer structure, a process for the preparation thereof and the use thereof.

BACKGROUND

Inorganic particles having a layer structure, such as clay minerals, and the modification thereof with dyes, polyhydric alcohols and alkylammonium ions are known [Lagaly, G., Clay minerals (1981)16, 1–21].

It is furthermore known that inorganic particles having a layer structure can be used as plastics additives in elastomers (EP 0 484 245) and thermoplastics [Mülhaupt, R., Kunststoffe [Plastics] 87(1997)4, 482–486]. A disadvantage is the high degree of agglomeration of the layer-like clay minerals, so that it is not possible to distribute layer-like clay minerals in finely divided form in thermoplastic melts.

Known solutions for dispersing layer-like clay minerals having particle sizes of from 1 to 500 nm in plastic melts are the addition of amine-substituted onium complexes (WO 93/04117) or the dispersing of phyllosilicates by dewatering and complexing with solutions of water-insoluble polymers (EP 0 822 163). However, these processes are very complicated, and low molecular weight compounds in the blends result in a decrease in the strength of the blends.

It is also known for the properties of aminoplast moldings to be modified by adding fillers such as inorganic fillers, woodmeal, carbon black, asbestos or glass fibers (Woebcken, Kunststoff-Handbuch (Plastics handbook) Vol. 10 of "Duroplaste", [Thermosetting Plastics][[)]], p. 267, Carl-Hanser-Verlag, Munich 1998). A disadvantage of the known solutions is the embrittlement of the aminoplast blends due to the limited filler compatibility.

It is furthermore known that blends of thermoplastics or thermosetting plastics and sheet silicates can be prepared by mechanical mixing of the components (U.S. Pat. No. 5,955, 535) or by sorptive treatment of sheet silicates with mixtures of thermosetting prepolymers and curing agents (U.S. Pat. No. 5,866,654). Due to the high molar mass of the polymers or prepolymers, the loading of the sheet silicates and the homogeneity of the loading are, however, limited.

SUMMARY OF THE INVENTION

The present invention provides inorganic particles having a layer structure which are suitable for preparing aminoplast semifinished products and moldings having an improved property spectrum and which also have good dispersibility in plastics and result in an improvement in the property spectrum of plastics.

In one embodiment, the invention is directed to polymer-modified inorganic particles having a layer structure, polymer-modified inorganic particles having a mean particle diameter of from 5 nm to 20 000 nm and an interlamellar content of from 20 to 5 000% by mass, based on the anhydrous inorganic particles, of a mixture of from 50 to 98% by mass of substantially aminoplasts and from 2 to 50% by mass of water, aminoplasts and from 2 to 50% by mass of water, the polymer-modified inorganic particles having been prepared by swelling of the inorganic particles with $C_1$–$C_{10}$ aldehydes as solutions in water, or mixtures of water and $C_1$–$C_8$ alcohols, which optionally contain acidic catalysts and subsequent reaction of the aldehyde-swollen inorganic particles with solutions or suspensions of polyfunctional $C_1$–$C_{30}$-amino compounds such as melamine, melamine derivatives, urea, urea derivatives, guanidine, guanidine derivatives, cyanamide, dicyandiamide, sulfonamides, and/or aniline and the salts thereof in water or mixtures of water and $C_1$–$C_8$ alcohols.

The inorganic particles having a layer structure are preferably silicates, phosphates, arsenates, titanates, vanadates, niobates, molybdates and/or manganates, in particular sheet silicates such as montmorillonite, bentonite, kaolinite, muscovite, hectorite, fluorohectorite, canemite, revdite, grumantite, ilerite, saponite, beidelite, nontronite, stevensite, laponite, taneolite, vermiculite, volkonskoite, magadite, rectorite, halloysite, kenyaite, sauconite, borofluorophlogopites and/or synthetic sheet silicates, the sheet silicates more preferably being sheet silicates having exchangeable cations such as alkali metal, alkaline earth metal, aluminum, iron and/or manganese cations.

Examples of suitable phosphates having a layer structure are compounds of the formula $H_2[M^{IV}(PO_4)_2] \cdot xH_2O$ ($M^{IV}$=Zr, Ti, Ge, SN, Pb) and $CaPO_4R \cdot H_2O$ (R=$CH_3$; $C_2H_5$). Examples of suitable arsenates having a layer structure are compounds of the formula $H_2[M^{IV}(AsO_4)_2] \cdot xH_2O$ and $H[Mn(AsO_4)_2] \cdot xH_2O$. Examples of suitable titanates having a layer structure are compounds of the formula $Na_4Ti_8O_{20} \cdot xH_2O$ and $K_2Ln_2Ti_3O_{10x} \cdot H_2O$.

Synthetic sheet silicates are obtained, for example, by reacting natural sheet silicates with sodium hexafluorosilicate.

The preferred particle diameter of the polymer-modified inorganic particles having a layer structure is from 100 to 1000 nm.

The aminoplasts contained in the polymer-modified inorganic particles are preferably melamine resins, urea resins, cyanamide resins, dicyandiamide resins, guanamine resins, sulfonamide resins and/or aniline resins.

The polymer-modified inorganic particles preferably have an interlamellar aminoplast content of from 50 to 150% by mass, based on the mass of the anhydrous inorganic particles.

Preferred melamine resins are polycondensates of melamine and melamine derivatives and $C_1$–$C_{10}$-aldehydes having a melamine or melamine derivative to $C_1$–$C_{10}$-aldehyde molar ratio of from 1:1 to 1:6 and the partial etherification products thereof with $C_1$–$C_{10}$-alcohols, preferred melamine derivatives being melamines, diaminomethyltriazines and diaminophenyltriazines substituted by hydroxy-$C_1$–$C_{10}$-alkyl groups, hydroxy-$C_1$–$C_4$-alkyl(oxa-$C_2$–$C_4$-alkyl)$_{1-5}$ groups and/or by amino-$C_1$–$C_{12}$-alkyl groups, particularly preferably 2-(2-hydroxyethylamino)-4, 6-diamino-1,3,5-triazine, 2-(5-hydroxy-3-oxapentylamino)-4,6-diamino-1,3,5-triazine and/or 2,4,6-tris(6-aminohexylamino)-1,3,5-triazine, ammeline, ammelide, melem, melon, melam, benzoguanamine, acetoguanamine, tetramethoxymethylbenzoguanamine, caprinoguanamine and/or butyroguanamine, and the $C_1$–$C_{10}$-aldehyde are preferably formaldehyde, acetaldehyde, trimethylolacetaldehyde, acrolein, furfurol, glyoxal and/or glutaraldehyde, particularly preferably formaldehyde.

The melamine resins in the polymer-modified inorganic particles according to the invention and having a layer structure can likewise contain from 0.1 to 10% by mass, based on the sum of melamine and melamine derivatives, of incorporated phenols and/or urea. Suitable phenol components are phenol, $C_1$–$C_9$-alkylphenol, hydroxyphenols and/or bisphenols.

Examples of partial etherification products of melamine resins with $C_1$–$C_{10}$-alcohols are methylated or butylated melamine resins.

Examples of urea resins optionally contained as aminoplasts in the polymer-modified inorganic particles according to the invention and having a layer structure are also cocondensates with phenols, acid amides or sulfonamides, in addition to urea/formaldehyde resins.

Examples of sulfonamide resins optionally contained as aminoplasts in the polymer-modified inorganic particles according to the invention and having a layer structure are sulfonamide resins obtained from p-toluenesulfonamide and formaldehyde.

Examples of guanamine resins optionally contained as aminoplasts in the polymer-modified inorganic particles according to the invention and having a layer structure are resins which contain benzoguanamine, acetoguanamine, tetramethoxymethylbenzoguanamine, caprinoguanamine and/or butyroguanamine as guanamine components.

Examples of aniline resins optionally contained as aminoplasts in the polymer-modified inorganic particles according to the invention and having a layer structure are aniline resins which, in addition to aniline, may also contain toluidine and/or xylidines as aromatic diamines.

The content of the polymer-modified inorganic particle being substantially aminoplasts and water means that, on condensation of $C_1$–$C_{10}$ aldehydes and polyfunctional $C_1$–$C_{30}$ amino compounds in the inorganic particles, very small amounts of $C_1$–$C_{10}$ aldehydes and polyfunctional $C_1$–$C_{30}$ amino compounds may remain unconverted and may be contained as further components of the polymer-modified inorganic particle.

The polymer-modified inorganic particles having a layer structure are prepared, according to the invention, by a process in which polymer-modified inorganic particles having a mean particle diameter of from 5 nm to 20,000 nm and an interlamellar content of from 20 to 5000% by mass, based on the mass of the anhydrous inorganic particle, of a mixture of from 50 to 98% by mass of substantially aminoplasts and from 2 to 50% by mass of water are prepared by a multistage process in which, in the 1st process stage, inorganic particles having a layer structure are loaded, in a stirred reactor at a temperature of 20 to 100° C. and with a residence time of from 10 to 180 min by swelling, with from 15 to 4000% by mass, based on the mass of the anhydrous inorganic particles, of $C_1$–$C_{10}$-aldehyde as from 5 to 60% solutions in water or mixtures of from 5 to 99% by weight of water and from 95 to 1% by mass of $C_1$–$C_8$ alcohols, which optionally contain from 0.05 to 1.0% by mass, based on the $C_1$–$C_{10}$ aldehyde, of acidic catalysts, a pH>8.5, and in a second process stage, the organic particles swollen with $C_1$–$C_{10}$ aldehydes are homogenized with solutions or suspensions of polyfunctional $C_1$–$C_{30}$ amino compounds such as melamine, melamine derivatives, urea, urea derivatives, guanidine, guanidine derivatives, cyanamide, dicyandiamide, sulfonamide and/or aniline and salts thereof in water or mixtures of from 5 to 99% by weight of water and from 95 to 1% by mass of $C_1$–$C_8$-alcohols, having a solids content of from 5 to 90% by mass, and are reacted with residence times of from 20 to 150 min at a temperature of 50 to 95√ C. [[,]] The molar ratio of the added polyfunctional $C_1$–$C_{30}$ amino compounds to $C_1$–$C_{10}$-aldehydes is from 1:2 to 1:6. [[,]] The polymer-modified inorganic particles are then dried with removal of the liquid phase at a temperature of 20 to 180° C. and with a residence time of from 0.1 to 8 hours.

In the process for preparing polymer-modified inorganic particles, preferably formaldehyde, acetaldehyde, trimethylolacetaldehyde, acrolein, benzaldehyde, furfurol, glyoxal, glutaraldehyde, phthalaldehyde and/or terephthalaldehyde, particularly preferably formaldehyde, is used as the $C_1$–$C_{10}$-aldehyde in the first process step.

In the process for preparing polymer-modified inorganic particles, inorganic acids, such as hydrochloric acid and sulfuric acid, and/or organic acids, such as formic acid, acetic acid, oxalic acid, p-toluenesulfonic acid and lactic acid, can be used as acidic catalysts in the first process step. Acids having a buffer function, such as citric acid, acetic acid and/or phosphoric acid, and acidic salts having a buffer function, such as sodium hydrogen phosphate or potassium hydrogen phosphate, are preferred.

The melamine derivatives used in the second process step in the preparation of polymer-modified inorganic particles are preferably selected from melamines, diaminomethyltriazines and/or diaminophenyltriazines substituted by hydroxy-$C_1$–$C_{10}$-alkyl groups, hydroxy-$C_1$–$C_4$-alkyl(oxa-$C_2$–$C_4$-alkyl)$_{1-5}$ groups and/or by amino-$C_1$–$C_{12}$-alkyl groups, particularly preferably 2-(2-hydroxyethylamino)-4,6-diamino-1,3,5-triazine, 2-(5-hydroxy-3-oxapentylamino)-4,6-diamino-1,3,5-triazine, 2,4,6-tris(6-aminohexylamino)-1,3,5-triazine, 2,4-(di-5-hydroxy-3-oxapentylamine)-6-methyl-1,3,5-triazine, ammeline, ammelide, meleme, melone and/or melame.

Urea derivatives used in the second process step in the preparation of polymer-modified inorganic particles are preferably thiourea and urea or thiourea substituted by $C_1$–$C_{10}$-alkyl groups, $C_6$–$C_{14}$-aryl groups, hydroxy-$C_1$–$C_{10}$-alkyl groups, hydroxy-$C_1$–$C_4$-alkyl (oxa-$C_2$–$C_4$-alkyl)$_{1-5}$ groups and/or by amino-$C_1$–$C_{12}$-alkyl groups.

The salts of melamine, melamine derivatives, urea, urea derivatives, guanidine, guanidine derivatives, cyanamide, dicyandiamide, sulfonamides and/or aniline which are used in the second process step in the preparation of polymer-modified inorganic particles are preferably salts with inorganic and/or organic anions, preferably fluorides, chlorides, bromides, iodides, sulfates, phosphates, borates, silicates, cyanurates, tosylates, formates, acetates, propionates, butyrates and/or maleinates.

The polymer-modified inorganic particles are particularly suitable for flameproofing plastics, in particular in combination with inorganic and/or organic salts having ammonium, alkylammonium, arylammonium, phosphonium, alkylphosphonium, arylphosphonium, alkali metal and/or alkaline earth metal cations and/or phosphate, phosphite, phosphonate, silicate and/or borate anions and/or with polyhydric alcohols of the type consisting of erythritol, pentaerythritol, pentitol and/or hexitol, as additives for increasing the scratch resistance and UV stability, and for improving the barrier properties of plastics and plastics laminates, and as moldings and as a catalyst or catalyst support.

When the polymer-modified inorganic particles are used as an additive for flameproofing plastics, particularly preferred combinations are those which contain ammonium polyphosphate and pentaerythritol.

When the polymer-modified inorganic particles are used as a plastics blend, it is advantageous to add to the polymer-modified inorganic particles from 0.1 to 5% by mass, based on the mass of the polymer-modified inorganic particles, of water-soluble, water-dispersible and/or water-emulsifiable polymers, preferably polyvinyl alcohol, polyvinyl acetate, maleic anhydride copolymers and/or saturated or unsaturated polyesters.

Further polyolefins according to the invention are those having a content of from 1 to 60% by mass, based on the mass of the polyolefins used, of polymer-modified inorganic particles having a layer structure and optionally, as further additives, inorganic or organic salts, fillers, reinforcing materials, polymeric dispersants, assistants and/or polyhydric alcohols.

It being possible for the inorganic or organic salts to be salts having ammonium, alkylammonium, phosphonium, alkylphosphonium, arylphosphonium, alkali metal and/or alkaline earth metal cations and/or salts having phosphite, phosphate, phosphonate, silicate and/or borate anions, which may be contained in an amount of up to 25% by mass in the polyolefin, the fillers and/or reinforcing materials being inorganic or organic fillers and/or fibers, which may be contained in an amount of up to 40% by mass in the polyolefin, the polymeric dispersants being water-soluble, water-dispersible and/or water-emulsifiable polymers which may be contained in an amount of up to 3% by mass in the polyolefin, and the polyhydric alcohols being polyhydric alcohols such as erythritol, pentaerythritol, pentitol and/or hexitol, which may be contained in an amount up to 15% by mass in the polyolefin.

The amount of the polymer-modified inorganic particles having a layer structure is preferably from 3 to 30% by mass, based on the mass of the polyolefins.

The polyolefins according to the invention, containing polymer-modified inorganic particles having a layer structure and optionally further additives, have an improved property spectrum with respect to the degree of flameproofing, toughness, scratch resistance, UV stability and barrier properties.

The polyolefins according to the invention, containing polymer-modified inorganic particles having a layer structure and optionally further additives, are preferably poly-$C_2$–$C_5$-α-olefins or copolymers of $C_2$–$C_5$-α-olefins and α-olefins having 2 to 18 C atoms such as linear and/or branched polyethylene homo- and/or copolymers, cycloolefin/ethylene copolymers, polypropylene homopolymers, random propylene copolymers, propylene block copolymers, random propylene block copolymers, isotactic polybut-1-ene and/or 4-methylpent-1-ene homo- and/or copolymers.

$Al_2O_3$, $Al(OH)_3$, barium sulfate, calcium carbonate, glass beads, silica, mica, quartz powder, slate powder, hollow microspheres, carbon black, talc, crushed rock, woodmeal and/or cellulose powder may be present as fillers in the polyolefins according to the invention, which contain polymer-modified inorganic particles having a layer structure and optionally further additives.

Examples of reinforcing materials in the polyolefins according to the invention, which contain polymer-modified inorganic particles having a layer structure and optionally further additives, are wood fibers, cellulose fibers, flax, jute and kenaf.

Preferred reinforcing materials which may be contained in the polyolefins according to the invention, which contain polymer-modified inorganic particles having a layer structure and optionally further additives, are inorganic fibers, such as glass fibers and/or carbon fibers, natural fibers, such as cellulose fibers, and/or plastic fibers, such as fibers of polyacrylonitrile, polyvinyl alcohol, polyvinyl acetate, polypropylene, polyesters and/or polyamides.

Water-soluble, water-dispersible and/or water-emulsifiable polymers may be present as polymeric dispersants in the polyolefins according to the invention, which contain polymer-modified inorganic particles having a layer structure and optionally further additives.

Examples of water-soluble polymers which may be contained in the polyolefins according to the invention, which contain polymer-modified inorganic particles having a layer structure and optionally further additives, are polyvinyl alcohol, polyacrylamide, polyvinylpyrrolidone, polyethylene oxide, methylcellulose, ethylcellulose, hydroxyethylcellulose and/or carboxymethylcellulose.

The water-dispersible or water-emulsifiable polymers optionally contained in the polyolefins according to the invention, which contain polymer-modified inorganic particles having a layer structure and optionally further additives, are thermoplastics, elastomers and/or waxes.

Examples of suitable thermoplastics are cellulose esters, cellulose ethers, polyvinyl acetate, polyvinyl propionate, polyacrylates, unsaturated or saturated polyesters, maleic anhydride copolymers, polypropylene oxide and/or ethylene/vinyl acetate copolymers. Preferred maleic anhydride copolymers are copolymers in which the anhydride groups have been modified by amidation and/or imidation with hydrophobic hydrocarbon substituents or esterification with hydrophilic polyalkylene oxide substituents.

Examples of water-dispersible or water-emulsifiable elastomers are styrene/butadiene rubbers, acrylate rubbers, polyurethanes and/or fluoroelastomers.

Examples of suitable waxes are polyolefin wax oxidates, such as polyethylene wax oxidates, or waxes based on ethylene/vinyl acetate copolymers.

Particularly preferred polymeric dispersants which are optionally contained in the polyolefins according to the invention, which contain polymer-modified inorganic particles having a layer structure and optionally further additives, are polyvinyl alcohol, polyvinyl acetate, maleic anhydride copolymers and/or unsaturated or saturated polyesters.

The polyolefins according to the invention, which contain polymer-modified inorganic particles having a layer structure and optionally further additives, can be prepared by a process in which mixtures of polyolefins, polymer-modified inorganic particles and optionally, as further additives, inorganic or organic salts, fillers, reinforcing materials, polymeric dispersants in the form of solutions, dispersions or emulsions, assistants and/or polyhydric alcohols are melted in continuous kneaders, or in which polyolefins are melted in continuous kneaders and the polymer-modified inorganic particles and optionally inorganic or organic salts, fillers, reinforcing materials, polymeric dispersants in the form of solutions, dispersions or emulsions and/or polyhydric alcohols are metered into the polymer melt. [[,]] The mixtures are homogenized at melt temperatures of from 30 to 100 degrees above the melting point or softening point of the polyolefins, optionally degassed in vacuo, discharged and granulated, or molded directly from the melt to give semi-finished products or moldings.[[,]] The amount of the polymer-modified inorganic particles having a layer structure and optionally, as further additives, inorganic or organic salts, fillers, reinforcing materials, polymeric dispersants, assistants and/or polyhydric alcohols in the polyolefins is from 1 to 60% by mass, based on the mass of the polyolefins used.

Continuous kneaders used in the preparation of the polyolefins according to the invention, which contain polymer-modified inorganic particles having a layer structure and optionally further additives, are preferably twin-screw extruders having an L/D of from 30 to 48 or single-screw extruders having a plunger screw.

In the preparation, from 0.01 to 2.5% by mass of stabilizers, from 0.1 to 1% by mass of antistatic agents and/or from 0.01 to 5% by mass of processing assistants, based in each case on the mass of the polyolefins used, can be added as assistants.

Suitable stabilizers are preferably mixtures of from 0.01 to 0.6% by mass of phenolic antioxidants, from 0.01 to 0.6% by mass of 3-arylbenzofuranones, from 0.01 to 0.6% by mass of phosphite-based processing stabilizers, from 0.01 to 0.6% by mass of disulfide-based and thioether-based high temperature stabilizers and/or from 0.01 to 0.8% by mass of sterically hindered amines (HALS).

Processing assistants which may be added in the preparation of the polyolefins according to the invention, which contain polymer-modified inorganic particles having a layer structure and optionally further additives, are calcium stearate, magnesium stearate and/or waxes.

The polyolefins or olefin copolymers used in the preparation of the polyolefins according to the invention, which contain polymer-modified inorganic particles having a layer structure and optionally further additives, preferably contain from 0.05 to 2% by mass, based on the mass of the polyolefins used, of olefin copolymers and/or olefin graft copolymers containing acid, acid anhydride and/or epoxide groups, preferably ethylene/butyl acrylate/acrylic acid terpolymers having an acrylic acid content of from 0.1 to 2% by mass or maleic anhydride-grafted polypropylene having a maleic anhydride content of from 0.05 to 0.5% by mass, as a compatibilizer for the polymer-modified inorganic particles having a layer structure and the inorganic or organic salts and/or polyhydric alcohols. The olefin graft copolymers can be prepared by customary processes, such as by reacting the polyolefin with the unsaturated monomer in the presence of thermal free radical initiators in the solid phase or in the melt.

The polyolefins according to the invention, which contain polymer-modified inorganic particles having a layer structure and optionally further additives, have an improved property spectrum, in particular a good degree of flame-proofing. They are particularly useful as films, fibers, sheets, pipes, coatings, hollow bodies, injection molded products and foams. The particular advantage of these semifinished products and moldings is the improved degree of flame-proofing, toughness, scratch resistance and UV stability and the improved barrier properties.

Thermosetting plastics containing from 2 to 80% by mass, based on the mass of the thermosetting plastic, polymer-modified inorganic particles having a layer structure and optionally, as further additives, inorganic or organic salts, fillers, reinforcing materials, polymeric dispersants, assistants and/or polyhydric alcohols are also included within the invention, the inorganic or organic salts being salts having ammonium, alkylammonium, phosphonium, alkylphosphonium, arylphosphonium, alkali metal and/or alkaline earth metal cations and/or salts having phosphite, phosphate, phosphonate, silicate and/or borate anions, which may be contained in an amount of up to 60% by mass in the thermosetting plastics, the fillers and/or reinforcing materials being inorganic or organic fillers and/or fibers, which may be contained in an amount of up to 70% by mass in the thermosetting plastics, the polymeric dispersants being water-soluble, water-dispersible and/or water-emulsifiable polymers which may be contained in an amount of up to 5% by mass in the thermosetting plastics, and the polyhydric alcohols being polyhydric alcohols such as erythritol, pentaerythritol, pentitol and/or hexitol, which are contained in an amount of up to 30% by mass in the thermosetting plastics.

The thermosetting plastics preferably contain from 5 to 50% by mass of polymer-modified inorganic particles, based on the mass of the thermosetting plastic.

Examples of thermosetting plastics are melamine resins, urea resins, guanamine resins, cyanamide resins, dicyandiamide resins, sulfonamide resins and aniline resins.

The thermosetting plastics may contain aminoplasts of the same composition which may be contained in the interlamellar sites of the polymer-modified inorganic particles.

The further additives optionally contained in the thermosetting plastics containing polymer-modified inorganic particles having a layer structure may be additives which may also be contained in the polyolefins containing polymer-modified inorganic particles having a layer structure and optionally further additives.

The thermosetting plastics according to the invention, which contain polymer-modified inorganic particles having a layer structure and optionally further additives, are prepared by a process in which mixtures of precondensates of thermosetting plastics, polymer-modified inorganic particles having a layer structure and optionally, as further additives, inorganic or organic salts, fillers, reinforcing materials, polymeric dispersants in the form of solutions, dispersions or emulsions, assistants and/or polyhydric alcohols are molded by customary processes to give semifinished products or moldings and are cured. [[,]] The amount of polymer-modified inorganic particles having a layer structure and optionally, as further additives, inorganic or organic salts, fillers, reinforcing materials, polymeric dispersants, assistants and/or polyhydric alcohols in the blends is from 1 to 80% by mass, based on the mass of the thermosetting plastic used, the inorganic or organic salts being salts having ammonium, alkylammonium, phosphonium, alkylphosphonium, arylphosphonium, alkali metal and/or alkaline earth metal cations and/or salts having phosphite, phosphate, polyphosphates, phosphonates, silicate and/or borate anions, which may be contained in an amount up to 45% by mass in the thermosetting plastic, the fillers and/or reinforcing material being inorganic or organic fillers and/or fibers which may be contained in an amount up to 60% by mass in the thermosetting plastic, the polymeric dispersants being water-soluble, water-dispersible and/or water-emulsifiable polymers which may be contained in an amount up to 5% by mass in the thermosetting plastic, and the polyhydric alcohols being polyhydric alcohols such as erythritol, pentaerythritol, pentitol and/or hexitol, which may be contained in an amount up to 15% by mass in the thermosetting plastic.

A preferred variant for the preparation of thermosetting plastics according to the invention, which contain modified inorganic particles having a layer structure and optionally further additives, comprises preparing the precondensates of the thermosetting plastics by polycondensation of the monomers on which the precondensates of the thermosetting plastics are based, in the presence of the polymer-modified inorganic particles having a layer structure and optionally, as further additives, inorganic or organic salts, fillers, reinforcing materials, assistants polymeric dispersants and/or polyhydric alcohols.

The water-soluble, water-dispersible and/or water-emulsifiable polymers optionally contained, as polymeric dispersants, in the thermosetting plastics according to the invention, which contain polymer-modified inorganic particles having a layer structure and optionally further additives, can likewise be formed in situ in the preparation of the thermosetting plastics, by adding to the mixtures present as aqueous dispersions or emulsions and comprising precondensates of aminoplasts and polymer-modified inorganic particles having a layer structure, before the preparation of the thermosetting plastics, instead of polymeric dispersants, mixtures of ethylenically unsaturated monomers and thermal free radical initiators, from which the water-soluble, water-dispersible and/or water-emulsifiable polymers are formed. Examples of suitable ethylenically unsaturated monomers are acrylamide, vinylpyrrolidone, $C_4$–$C_{18}$-(meth) acrylic esters and/or vinyl acetate.

Preferred semifinished products and moldings of polyolefins or thermosetting plastics containing polymer-modified inorganic particles having a layer structure and optionally further additives are films, prepregs, fibers, sheets, pipes, coatings, hollow bodies, injection molded products and foams.

The semifinished products and moldings according to the invention, comprising polyolefins containing polymer-modified inorganic particles having a layer structure and optionally further additives, can be prepared by customary methods for processing thermoplastics, poly-$C_2$–$C_5$-α-olefins or copolymers of $C_2$–$C_5$-α-olefins and α-olefins having 2 to 18 C atoms, which contain polymer-modified inorganic particles having a layer structure and optionally, as further additives, inorganic or organic salts, fillers, reinforcing materials, polymeric dispersants, assistants and/or polyhydric alcohols being melted in continuous kneaders, preferably in extruders having an L/D of from 30 to 48, at temperatures of from 30 to 120° C. above the melting points or softening points of the polyolefins, homogenized, and A) discharged via an annular die, taken off as a blown film by forcing in air and rolled up, or B) discharged via a slot die, applied to a chill roll unit and taken off as a cover film and rolled up or, in the case of chill roll units having a plurality of slot dies, taken off as a coextrusion film and rolled up, or C) added as a melt to a roll mill and then to a calender and taken off as a thermoformed film and rolled up or sealed on continuous sheets of metal foils, plastic films, paper webs or textile webs and taken off as multicomponent laminates and rolled up, or D) added as a melt to a calender and taken off as a thermoformed film and rolled up, taken off as a sheet via conveyor belts and cut or sealed on continuous sheets of metal foils, plastic films, paper webs or textile webs and taken off as multicomponent laminates and rolled up, or E) discharged via a profiled die and taken off as a profile, cut and fabricated, or F) discharged via an annular die, taken off as a tube by forcing in air and rolled up or taken off as a pipe, cut and fabricated, or G) discharged via a slot die after metering in blowing agents or discharged via an annular die by forcing in air and taken off as a foam sheet and rolled up or discharged via a circular die, taken off as an extrudate and cut into particle foam segments, or H) discharged via a slot die of a pipe coating unit and sealed in molten form on the rotating pipe, or I) discharged via an annular die with prior introduction of the conductors or of the made-up single cable and taken off as single cable or as made-up single cables provided with a cable sheath and rolled up, or K) extruded through annular dies as a parison, shaped by blowing out in a heated divided blow mold for hollow bodies and optionally being subjected, in a second blow mold, to additional longitudinal stretching by means of a stretching plunger, a further radial stretching by means of blown air, or L) injected into a heated injection mold for the production of the parison and, after removal, optionally preferably separate heating of the parison in a conditioning mold, transferred to the blow mold and shaped by blowing out to give a hollow body, or M) processed in injection molding machines, preferably with three-zone screws having a screw length of from 18 to 24 D, and high injection speeds and at mold temperatures of from 5 to 70° C., to give injection molded articles, or N) melted in melt spinning units comprising a plastifying extruder, a melt pump, a melt distributor, a capillary mold, a blow shaft and downstream apparatuses and extruded by means of the melt pump through the capillary mold into the blow shaft and taken off as filaments and further processed in downstream apparatuses.

Suitable processes for the production of semifinished products and moldings from mixtures of precondensates of thermosetting plastics, polymer-modified inorganic particles having a layer structure and optionally further additives to give semifinished products and moldings are formulations to give molding materials and thermoprocessing to give compression moldings, injection moldings, filaments or profiles by compression molding, injection molding, melt spinning or extrusion, or processing of solutions of the precondensates of thermosetting plastics, the precondensates containing the polymer-modified inorganic particles having a layer structure in dispersed form, to give thermosetting plastics fibers by centrifugal spinning, filament drawing, extrusion or fibrillation processes, optionally subsequent orientation, and curing, or processing of solutions of the precondensates of the thermosetting plastics, the precondensates containing the polymer-modified inorganic particles having a layer structure in dispersed form, to give microcapsules by introduction into an emulsifier-free aqueous dispersion of solid or liquid capsule core formers, curing and spray-drying, or processing of solutions of the precondensates of thermosetting plastics, the precondensates containing the polymer-modified inorganic particles having a layer structure in dispersed form, to give closed-cell foams by introduction into an emulsifier-free aqueous dispersion of volatile hydrocarbons, inert gases and/or inorganic carbonates, and discharge of hollow particles either into molds and curing to give closed-cell foams or through a mold and curing to give closed-cell foamed profiles, or processing of solutions of the precondensates of thermosetting plastics, the precondensates containing the polymer-modified inorganic particles having a layer structure in dispersed form, to give open-cell foams by introduction into an aqueous blowing agent emulsion of volatile hydrocarbons, inert gases and/or inorganic carbonates, heating to the boiling point or decomposition point of the blowing agent and discharge either into molds and curing to give open-cell foams or through a mold and curing to give open-cell foamed profiles, or production of coatings by formulation of solutions of the precondensates of the thermosetting plastics, the precondensates containing the polymer-modified inorganic particles having a layer structure in dispersed form, to give coating resin solutions or coating resin dispersions and subsequent discharge of coating resin solutions or coating resin dispersions onto sheet-like substrate materials, drying and curing, or production of laminates by formulation of solutions of the precondensates of thermosetting plastics, the precondensates containing the polymer-modified inorganic particles having a layer structure in dispersed form, to give impregnating resin solutions or impregnating resin dispersions and subsequent impregnation of sheet-like substrate materials, lamination and curing, or processing of precondensates of thermosetting plastics, the precondensates containing the polymer-modified inorganic particles having a layer structure in dispersed form, by the casting resin technology to give semifinished products, moldings or coatings.

EXAMPLE 1

In a 20 l stirred reactor having a bottom drain valve, 5.52 kg of 30% formaldehyde, 2.21 l of water and 300 g of montomrillonite are adjusted to a pH=9.0 with NaOH. After the mixture has been heated to 75° C., 4.27 kg of melamine are metered in. The reactor temperature is increased to 90° C. and, after dissolution of the melamine, a pH of 9.4 is established. When a water/melamine resin water compatibility of 1.2 has been reached in the condensation, cooling is effected, and the suspension is spray-dried.

The primary particles of the polymer-modified montmorillonite have a mean particle diameter of 180 nm codetermined by transmission electron microscopy. The content of melamine resin in the polymer-modified inorganic particle is 94% by mass, determined by elemental analysis and loss on ignition.

EXAMPLE 2

In a 20 l stirred reactor having a bottom drain valve, 4.1 kg of 30% formaldehyde, 0.88 kg of glyoxal, 3.4 l of water and 350 g of kaolinite are adjusted to a pH=9.1 with NaOH. After the mixture has been heated to 80° C., 1.5 kg of urea, 0.28 kg of thiourea, 0.24 kg of guanidine (in the form of guanidine carbonate) are metered in. The reactor temperature is increased to 95° C. and, after dissolution of the multifunctional amino compounds, a pH of 9.4 is established. When a water/aminoplast water compatibility of 1.4 has been reached in the condensation, cooling is effected and the suspension is spray-dried.

The primary particles of the polymer-modified montmorillonite have a mean particle diameter of 270 nm codetermined by transmission electron microscopy. The content of aminoplast in the polymer-modified inorganic particle is 87% by mass, determined by elemental analysis and loss on ignition.

EXAMPLE 3

A mixture of propylene copolymer (melt flow index 16.0 g/10 min at 230° C./2.16 kg, ethylene content 4.8% by mass) with 20% by mass of ammonium polyphosphate, 5% by mass of pentaerythritol, 0.15% by mass of 2-tert-butyl-4,6-diisopropylphenol, 0.10% by mass of bis-2,2,6,6-tetramethyl-4-piperidyl sebacate and 0.3% by mass of calcium stearate, based in each case on the mass of the propylene copolymer, is metered at 14.25. kg/h into a ZSK 27 Leistritz extruder, L/D=44, with side stream metering for pulverulent media and a decompression zone for vacuum devolatilization, temperature profile 20/200/200/200/200/200/200/200/200/200° C., melted and homogenized. Thereafter, the polymer-modified montmorillonite according to Example 1 is metered via a metering apparatus for pulverulent media at 0.75 kg/h into the polyolefin melt in zone 4. After thorough homogenization, the mixture is devolatilized in the decompression zone, discharged and granulated.

Specimens produced therefrom have a notched impact strength of 9.5 kJ/m$^2$, a modulus of elasticity of 2150 MPa and a Rockwell hardness (C scale) of 72.

Testing of the flame retardants according to UL 94 (1.6 mm) indicates classification in class V-0.

The invention claimed is:

1. A polymer-modified inorganic particle having a layer structure, wherein the polymer-modified inorganic particle has a mean particle diameter of from 5 nm to 20,000 nm and an interlamellar content of from 20 to 5000% by mass, based on the mass of the anhydrous inorganic particle, of a mixture of from 50 to 98% by mass of substantially aminoplasts and from 2 to 50% by mass of water, the polymer-modified inorganic particle having been prepared by swelling the inorganic particle with one or more $C_1$–$C_{10}$ aldehydes as a solution in water or a mixture of water and one or more $C_1$–$C_8$-alcohols, which optionally contains one or more acidic catalysts to form an aldehyde-swollen inorganic particle, and subsequently reacting the aldehyde-swollen inorganic particle with a solution or suspension of one or more polyfunctional $C_1$–$C_{30}$ amino compounds selected from the group, consisting of melamine, melamine derivatives, urea, urea derivatives, guanidine, guanidine derivatives, cyanamide, dicyandiamide, sulfonamide, a aniline and salts thereof in water or a mixture of water and one or more $C_1$–$C_8$ alcohols.

2. The polymer-modified inorganic particle as claimed in claim 1, wherein the inorganic particle having a layer structure is a silicate, phosphate, arsenate, titanate, vanadate, niobate, molybdate and/or manganate.

3. The polymer-modified inorganic particle as claimed in claim 1, wherein the aminoplasts are melamine resins, urea resins, cyanamide resins, dicyandiamide resins, guanamine resins, sulfonamide resins and/or aniline resins.

4. The polymer-modified inorganic particle as claimed in claim 3, wherein the aminoplasts are melamine resins selected from the group consisting of polycondensates of melamine, melamine derivatives, $C_1$–$C_{10}$-aldehydes with a molar melamine or melamine derivative/$C_1$–$C_{10}$-aldehyde ratio of from 1:1 to 1:6, and the partial etherification products thereof with $C_1$–$C_{10}$-alcohols.

5. The polymer-modified inorganic particle as claimed in claim 1, wherein the one or more $C_1$–$C_{10}$-aldehydes are selected from the group consisting of formaldehyde, acetaldehyde, trimethylolacetaldehyde, acrolein, benzaldehyde, furfurol, glyoxal, glutaraldehyde, phthalaldehyde and terephthalaldehyde.

6. The polymer-modified inorganic particle as claimed in claim 1, wherein the one or more polyfunctional $C_1$–$C_{30}$ amino compounds are melamine derivatives selected from the group consisting of melamines, diaminomethyltriazines and diaminophenyltriazines substituted by hydroxy-$C_1$–$C_{10}$-alkyl groups, hydroxy-$C_1$–$C_4$-alkyl(oxa-$C_2$–$C_4$-alkyl)$_{1-5}$ groups and/or amino-$C_1$–$C_{12}$-alkyl groups, ammeline, ammelide, melem, melon and melam.

7. The polymer-modified inorganic particle as claimed in claim 1, wherein the urea derivatives are selected from the group consisting of thiourea and urea or thiourea substituted by $C_1$–$C_{10}$-alkyl groups, $C_6$–$C_{14}$-aryl groups, hydroxy-$C_1$–$C_{10}$-alkyl groups, hydroxy-$C_1$–$C_4$-alkyl(oxa-$C_2$–$C_4$-alkyl)$_{1-5}$ groups and/or by amino-$C_1$–$C_{12}$-alkyl groups.

8. The polymer-modified inorganic particle as claimed in claim 1, wherein the one or more polyfunctional $C_1$–$C_{30}$ amino compounds are salts of melamine, melamine derivatives, urea, urea derivatives, guanidine, guanidine derivatives, cyanamide, dicyandiamide, sulfonamides and/or aniline with inorganic and/or organic anions.

9. A multistage process for the preparation of polymer-modified inorganic particles having a layer structure, wherein the polymer-modified inorganic particles have a mean particle diameter of from 5 nm to 20,000 nm and an interlamellar content of 20 to 5000% by mass, based on the mass of the inorganic particles, of a mixture of from 50 to 90% by mass of substantially aminoplasts and from 2 to 50% by mass of water, the process comprising:
loading inorganic particles having a layer structure in a stirred reactor at a temperature of from 20 to 100° C. and for a residence time of from 10 to 180 mm by swelling, with from 15 to 4000% by mass, based on the mass of the inorganic particles, of $C_1$–$C_{10}$-aldehydes as 5 to 60% solutions in water or mixtures of 5 to 99% by weight of water and 95 to 1% by mass of $C_1$–$C_8$-alcohols, which optionally contain from 0.05 to 1.0% by mass, based on the mass of the $C_1$–$C_{10}$-aldehydes, of acidic catalysts, at a pH>8.5,
homogenizing the inorganic particles swollen with $C_1$–$C_{10}$-aldehydes with solutions or suspensions of one or more polyfunctional $C_1$–$C_{30}$ amino compounds selected from the group consisting of melamine, melamine derivatives, urea, urea derivatives, guanidine, guanidine derivatives, cyanamide, dicyanmdiamide, sulfonamide, aniline and salts thereof in water or a mixture of from 5 to 99% by weight of water and from 95 to 1% by mass of one or more $C_1$–$C_8$-alcohols, having a solids content of 5 to 90% by mass,
and reacting the inorganic particles for a residence time of from 20 to 150 mm and at a temperature of from 50 to 95° C., the molar ratio of the added polyfunctional $C_1$–$C_{30}$-amino compounds to $C_1$–$C_{10}$-aldehydes being from 1:2 to 1:6, and subsequently drying the polymer modified inorganic particles with removal of the liquid phase at a temperature of from 20 to 180° C. and for a residence time of from 0.1 to 8 hours.

10. A polyolefin containing one or more modified inorganic particles having a layer structure as claimed in claim 1.

11. A polyolefin comprising from 1 to 60% by mass, based on the mass of the polyolefin, of one or more polymer-modified inorganic particles having a layer structure as claimed in claim 1 and optionally, as further additives, one or more inorganic or organic salts, fillers, reinforcing materials, polymeric dispersants, assistants and polyhydric alcohols, the inorganic or organic salts being salts having ammonium, alkylammonium, phosphonium, alkylphosphonium, arylphosphonium, alkali metal and/or alkaline earth metal cations and/or salts having phosphite, phosphate, phosphonate, silicate and/or borate anions, contained in an amount of up to 25% by mass on the mass of the polyolefin, the fillers and/or reinforcing materials being inorganic or organic fillers and/or fibers contained in an amount of up to 40% by mass in the polyolefin, the polymeric dispersant being a water-soluble, water-dispersible and/or water-emulsifiable polymer, which is present in an amount of up to 3% by mass in the polyolefin, and the polyhydric alcohols being one or more polyhydric alcohols selected from the group consisting of erythritol, pentaerythritol, pentitol and hexitol, which are contained in an amount of up to 15% by mass in the polyolefin.

12. A thermosetting plastic comprising from 2 to 80% by mass, based on the mass of the thermosetting plastic, of modified inorganic particles having a layer structure as claimed in claim 1 and optionally, as further additives, inorganic or organic salts, fillers, reinforcing materials, polymeric dispersants, assistants and/or polyhydric alcohols, the inorganic or organic salts being salts having ammonium, alkylammonium, phosphonium, alkylphosphonium, arylphosphonium, alkali metal and/or alkaline earth metal cations and/or salts having phosphite, phosphate, phosphonate, silicate and/or borate anions, which are contained in an amount of up to 60% by mass in the thermosetting plastic, the fillers and/or reinforcing materials being inorganic or organic fillers and/or fibers which are contained in an amount of up to 70% by mass in the thermosetting plastic, the polymeric dispersants being water-soluble, water-dispersible and/or water-emulsifiable polymers which are contained in an amount of up to 5% by mass in the thermosetting plastic, and the polyhydric alcohols being one or more polyhydric alcohols selected from the group consisting of erythritol, pentaerythritol, pentitol and hexitol, which are contained in an amount of up to 30% by mass in the thermosetting plastic.

13. A semifinished product or molding, in the form of a film, prepreg, fiber, sheet, pipe, coating, hollow body, injection molded product or foam, of a thermosetting plastic as claimed in claim 12.

14. The polymer-modified inorganic particle as claimed in claim 1, wherein the inorganic particle is at least one sheet silicate selected from the group consisting of montmorillonite, bentonite, kaolinite, muscovite, hectorite, fluorohectorite, kanemite, revdite, grumantite, ilerite, saponite, beidelite, nontronite, stevensite, laponite, taneolite, vermiculite, volkonskoite, magadite, rectorite, halloysite, kenyaite, sauconite or borofluorophlogophite, and synthetic smectites.

15. The polymer-modified inorganic particle as claimed in claim 14, wherein the sheet silicate has one or more exchange cations selected from the group consisting of alkali metal, alkaline earth metal, aluminum, iron, and manganese cations.

16. The polymer-modified inorganic particle as claimed in claim 4, wherein the aminoplasts are melamine derivatives selected from the group consisting of melamines, diaminomethyltriazines and diaminophenyltriazines substituted by hydroxy-$C_1$–$C_{10}$-alkyl groups, hydroxy-$C_1$–$C_4$-alkyl (oxa-$C_2$–$C_4$-alkyl)$_{1-5}$ groups and/or by amino-$C_1$–$C_2$-alkyl groups, ammeline, ammelide, melem, melon, melam, benzoguanamine, acetoguanamine, tetramethyoxymethylbenzoguanamine, caprinoguanamine and/or butyroguanamine.

17. The polymer-modified inorganic particle as claimed in claim 16, wherein the aminoplasts are selected from the group consisting of 2-(2-hydroxyethylamino)-4,6-diamino-1,3,5-triazine, 2-(5-hydroxy-3-oxapentylamino)-4,6-diamino-1,3,5-triazine and 2,4,6-tris(6-aminohexylamino)-1,3,5-triazine.

18. The polymer-modified inorganic particle as claimed in claim 16, wherein the one or more $C_1$–$C_{10}$-aldehydes are selected from the group consisting of formaldehyde, acetaldehyde, trimethylolacetaldehyde, acrolein, furfurol, glyoxal and glutaraldehyde.

19. The polymer-modified inorganic particle as claimed in claim 6, wherein the one or more polyfunctional $C_1$–$C_{30}$ amino compounds are selected from the group consisting of 2-(2-hydroxyethylamino)-4,6-diamino-1,3,5-triazine, 2-(5-hydroxy-3-oxapentylamino)-4,6-diamino-1,3,5-triazine, 2,4,6-tris(6-aminohexylamino)-1,3,5-triazine and 2,4-(di-5-hydroxy-3-oxapentylamino)-6-methyl-1,3,5-triazine.

20. The polymer-modified inorganic particle as claimed in claim 8, wherein the one or more polyfunctional $C_1$–$C_{30}$ amino compounds further comprising a functional group selected from the group consisting of fluorides, chlorides, bromides, iodides, sulfates, phosphates, borates, silicates, cyanurates, tosylates, formates, acetates, propionates, butyrates and maleates.

21. A flameproofing plastic comprising one or more polymer-modified inorganic particles as claimed in claim 1.

22. A flameproofing plastic as claimed in claim 21, further comprising one or more inorganic and/or organic salts having ammonium, alkylammonium, arylammonium, phosphonium, alkylphosphonium, arylphosphonium, alkali metal and/or alkaline earth metal cations and/or phosphate, phosphite, phosphonate, silicate and/or borate anions.

23. A flameproofing plastic as claimed in claim 21, further comprising one or more polyhydric alcohols selected from the group consisting of erythritol, pentaerythritol, pentitol and hexitol.

24. An additive for increasing the scratch resistance and UV stability and improving the barrier properties of a plastic or plastic laminate, comprising one or more inorganic particles according to claim 1.

25. A molding material comprising one or more inorganic particles as claimed in claim 1.

26. A catalyst or catalyst support comprising one or more inorganic particles as claimed in claim 1.

27. A semifinished product or molding, in the form of a film, prepreg, fiber, sheet, pipe, coating, hollow body, injection molded product or foam, of a polyolefin as claimed in claim 11.

* * * * *

UNITED STATES PATENT AND TRADEMARK OFFICE
CERTIFICATE OF CORRECTION

PATENT NO.       : 7,196,131 B2
APPLICATION NO.  : 10/450427
DATED            : March 27, 2007
INVENTOR(S)      : Rätzsch et al.

It is certified that error appears in the above-identified patent and that said Letters Patent is hereby corrected as shown below:

On the Title Page

(56) References Cited,                Delete "Rätzch",
U.S. Patent Documents,                Insert --Rätzsch--
2004/0082697 A1...

In the Claims

Column 12, line 41, Claim 1           Delete "contains",
                                      Insert --contain--

Column 12, line 46, Claim 1           Delete "group,",
                                      Insert --group--

Column 13, line 35, Claim 9           Delete "mm",
                                      Insert --min--

Column 13, line 54, Claim 9           Delete "mm",
                                      Insert --min--

Signed and Sealed this

Twenty-fifth Day of December, 2007

JON W. DUDAS
*Director of the United States Patent and Trademark Office*